United States Patent
Talbot et al.

(10) Patent No.: US 12,153,560 B1
(45) Date of Patent: Nov. 26, 2024

(54) DATABASE NORMALIZATION USING STATISTICAL ANALYSIS

(71) Applicant: Tableau Software, LLC, Seattle, WA (US)

(72) Inventors: Justin Talbot, Seattle, WA (US); Daniel Ting, Edmonds, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/368,827

(22) Filed: Jul. 7, 2021

(51) Int. Cl.
| | | |
|---|---|---|
| *G06F 16/22* | (2019.01) | |
| *G06F 11/34* | (2006.01) | |
| *G06F 16/21* | (2019.01) | |
| *G06F 16/215* | (2019.01) | |

(52) U.S. Cl.
CPC ...... *G06F 16/2282* (2019.01); *G06F 11/3409* (2013.01); *G06F 16/211* (2019.01); *G06F 16/215* (2019.01)

(58) Field of Classification Search
CPC ........................... G06F 16/2282; G06F 16/215
USPC ....................................................... 707/802
See application file for complete search history.

(56) References Cited

U.S. PATENT DOCUMENTS

| | | | |
|---|---|---|---|
| 8,086,598 B1* | 12/2011 | Lamb ............... | G06F 16/24544 707/606 |
| 2003/0084043 A1* | 5/2003 | Acharya ............. | G06F 16/2462 707/999.005 |
| 2005/0065756 A1* | 3/2005 | Hanaman ............... | G06Q 10/10 703/2 |
| 2007/0226196 A1* | 9/2007 | Adya ................ | G06F 16/24539 |
| 2008/0033914 A1* | 2/2008 | Cherniack ............ | G06F 16/283 |
| 2010/0106747 A1* | 4/2010 | Honzal ................. | G06F 16/283 707/E17.005 |
| 2013/0117217 A1* | 5/2013 | Bhide ................... | G06F 16/254 707/602 |
| 2013/0124241 A1* | 5/2013 | Yeung ................. | G06F 16/2282 705/7.11 |
| 2015/0074238 A1* | 3/2015 | Freris .................. | H03M 7/3064 709/219 |
| 2018/0081939 A1* | 3/2018 | Hopeman ........... | G06F 16/2282 |
| 2019/0197162 A1* | 6/2019 | Chiang ............... | G06F 16/2291 |

* cited by examiner

*Primary Examiner* — Muluemebet Gurmu
(74) *Attorney, Agent, or Firm* — Morgan, Lewis & Bockius LLP

(57) ABSTRACT

A method for generating schemas to compress storage of denormalized data includes receiving user selection of an initial data table and constructing a snowflake schema to decompose the initial data table into a plurality of tables. Tables in the plurality of tables that are related to one another are connected by foreign keys. The snowflake schema is constructed according to a cost model that balances the cost of storing the plurality of tables and the cost of storing the foreign keys. The method also includes transforming data in the initial data table into the plurality of tables according to the snowflake schema.

11 Claims, 16 Drawing Sheets

| Aisle ID | Dept. ID | Product ID | Order ID | Add to Cart Order | Reorder? | User ID | Order No. | Order dow | Hour of Day | Days Since Last Order | Product Name | Dept. Name | Aisle Name |
|---|---|---|---|---|---|---|---|---|---|---|---|---|---|
| 9 | 17 | 209 | 94246 | 5 | 0 | 114082 | 26 | 0 | 20 | 1 Vanilla Cola | beverages | cold drinks |
| 9 | 17 | 209 | 192465 | 2 | 1 | 119977 | 2 | 0 | 16 | 3 Vanilla Cola | beverages | cold drinks |
| 1 | 20 | 554 | 11931 | 15 | 0 | 183076 | 2 | 4 | 10 | 7 Turkey Chili | deli | soups salads |
| 2 | 21 | 1600 | 889706 | 10 | 1 | 35044 | 3 | 4 | 23 | 29 Mint Chip Ice Cream | frozen food | freezer |
| 2 | 21 | 1600 | 930762 | 10 | 1 | 198704 | 75 | 4 | 13 | 2 Mint Chip Ice Cream | frozen food | freezer |
| 1 | 20 | 2530 | 173348 | 1 | 1 | 50640 | 44 | 3 | 14 | 8 Original Potato Salad | deli | soups salads |
| 11 | 3 | 3991 | 238113 | 14 | 0 | 16725 | 1 | 6 | 11 | Macaroni and Cheese | prepared food | hot counter |
| 11 | 3 | 3991 | 224528 | 4 | 0 | 143314 | 3 | 4 | 16 | 30 Macaroni and Cheese | prepared food | hot counter |
| 4 | 1 | 4977 | 443340 | 9 | 1 | 141061 | 44 | 1 | 9 | 3 Soothing Face Mask | health and beauty | personal care |
| 4 | 1 | 4977 | 447580 | 9 | 1 | 13209 | 12 | 3 | 18 | 7 Soothing Face Mask | health and beauty | personal care |
| 1 | 20 | 8121 | 1358749 | 5 | 0 | 127687 | 11 | 2 | 6 | 14 Split Pea Soup | deli | soups salads |
| 1 | 20 | 8121 | 1358865 | 10 | 0 | 50424 | 1 | 3 | 10 | Split Pea Soup | deli | soups salads |
| 1 | 20 | 8121 | 1370509 | 8 | 0 | 145721 | 4 | 5 | 11 | 28 Split Pea Soup | deli | soups salads |
| 9 | 17 | 11888 | 680012 | 13 | 0 | 137641 | 3 | 4 | 17 | 4 Coconut Water | beverages | cold drinks |
| 9 | 17 | 11888 | 808420 | 5 | 1 | 74291 | 6 | 2 | 8 | 21 Coconut Water | beverages | cold drinks |

Figure 4A

| Order ID | User ID | Order No. | Order dow | Hour of Day | Days Since Order |
|---|---|---|---|---|---|
| 94246 | 114082 | 26 | 0 | 20 | 1 |
| 192465 | 119977 | 2 | 0 | 16 | 3 |
| 11931 | 183076 | 2 | 4 | 10 | 7 |
| 899706 | 35044 | 3 | 4 | 23 | 29 |
| 900762 | 186704 | 75 | 4 | 13 | 2 |
| 173948 | 50640 | 44 | 3 | 14 | 8 |
| 2339113 | 16725 | 1 | 6 | 11 | |
| 2243528 | 143314 | 3 | 4 | 16 | 30 |
| 443340 | 141061 | 44 | 1 | 9 | 3 |
| 447560 | 13269 | 12 | 3 | 16 | 7 |
| 1358749 | 127687 | 11 | 2 | 6 | 14 |
| 1358865 | 50424 | 1 | 3 | 10 | |
| 1370509 | 145721 | 4 | 5 | 11 | 28 |
| 600612 | 137641 | 3 | 4 | 17 | 4 |
| 600420 | 74291 | 6 | 2 | 8 | 21 |
| 8573 | 74291 | 1 | 2 | 8 | |

Normalized Data Table 420-2

| Dept. ID | Dept. Name |
|---|---|
| 1 | health and beauty |
| 2 | bakery |
| 3 | prepared food |
| ... | ... |
| 17 | beverages |
| 18 | seafood |
| 19 | poultry |
| 20 | deli |
| 21 | frozen food |

Normalized Data Table 420-5

Figure 4G

DATABASE NORMALIZATION USING STATISTICAL ANALYSIS

TECHNICAL FIELD

The disclosed implementations relate generally to database normalization, and more specifically to transforming a denormalized database into an equivalent normalized database based on statistical analysis of the de-normalized database.

BACKGROUND

Data visualization applications enable a user to understand information in a database visually, including distribution, trends, outliers, and other factors that are important to making business decisions. Real world datasets are often stored and shared as monolithic denormalized tables since they are easier to share and query. Working with denormalized data can pose a challenge for a user since all data is presented at a flat level with no discernment to level of detail or relationship to meaningful objects. Organization of a dataset (e.g., a data source or a database) into a normalized schema (e.g., a normalized database) with data tables that correspond to meaningful objects or levels of detail can improve the usability and interpretability of the data, thereby providing the information to users in a user-friendly format for data analysis.

SUMMARY

Transforming a denormalized dataset (e.g., a denormalized database or a denormalized data table) into a schema (e.g., a normalized schema or a normalized database) allows information stored in the dataset to be presented to users in a meaningful manner. Further, normalized schemas have the benefit of reduced data redundancy, thereby reducing storage size (e.g., require storage space) and improving query performance.

Transforming a denormalized database into a normalized schema poses several challenges. To begin with, a denormalized table can be decomposed into any one of many possible schemas, and functional dependencies within the denormalized table need to be identified and maintained. While many normalized schema options are available, some normalized schemas may be preferable to others based on, for example, how the data is organized, reducing redundancy, and/or the cost of storing the schema. Additionally, the process of selecting a schema (e.g., a normalized schema) may be time consuming due to the large number of possible schemas that the denormalized table can be transformed into, and a normalized schema does not necessarily provide the best (e.g., most compact or most logical) representation of the data set. Thus, the technical problem of selecting and generating a normalized schema to represent a denormalized dataset can be particularly challenging, and a solution for efficiently and robustly selecting and generating schemas is desired.

In accordance with some implementations, a method for generating schemas to compress storage of denormalized data is performed at a computing device having a display, one or more processors, and memory. The memory stores one or more programs configured for execution by the one or more processors. The computer receives user selection of an initial data table (e.g., a denormalized database, denormalized data, or a denormalized dataset) and constructs a snowflake schema (e.g., a normalized snowflake schema, a normalized database schema, or a normalized database) to decompose the initial data table into a plurality of tables with related tables connected by foreign keys. The snowflake schema is selected and constructed according to a cost model (e.g., cost function) that balances the cost of storing the plurality of tables and the cost of storing the foreign keys. The computer then transforms data in the initial data table into the plurality of tables according to the snowflake schema.

In some implementations, the cost model determines the cost of storing the plurality of tables by calculating an entropy value for each column of the initial data table and an estimated number of rows in each of the plurality of tables In some implementations, constructing the snowflake schema includes performing a recursive process in which each recursive step uses entropy values calculated in a previous recursive step for solving the cost model for the respective recursive step.

In some implementations, the plurality of tables are related to one another via one or more many-to-one relationships.

In some implementations, the snowflake schema includes a single primary table and one or more secondary tables, and the primary table is related to each of the one or more secondary tables via a respective sequence of one or more many-to-one relationships.

In some implementations, the initial data table is a flat data table.

In some implementations, the cost model determines the total cost of storing the snowflake schema (e.g., the snowflake schema is selected based on the file size of the snowflake schema).

In some implementations, the cost model determines the file size of storing the snowflake schema.

In some implementations, the number of tables in the plurality of tables is determined dynamically based on the cost model.

In some implementations, the number of tables in the snowflake schema is determined dynamically independently of user input (e.g., the number of tables in the snowflake schema is not predetermined).

In accordance with some implementations, a system for analyzing data from data sources includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

Thus methods, systems, and graphical user interfaces are provided for generating schemas to compress storage of denormalized data.

BRIEF DESCRIPTIONS OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

Figure 3A:
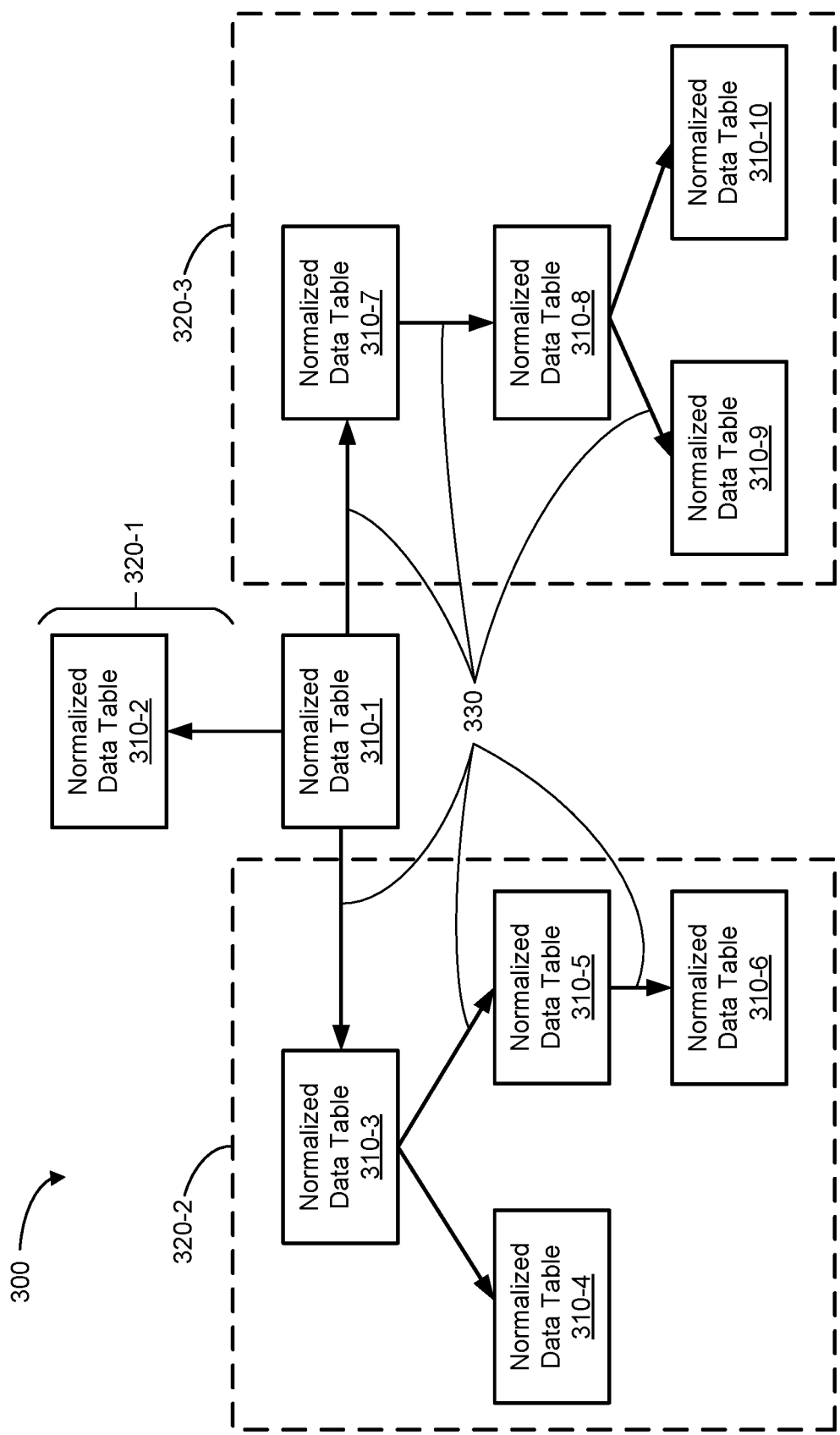
Figure 3B:
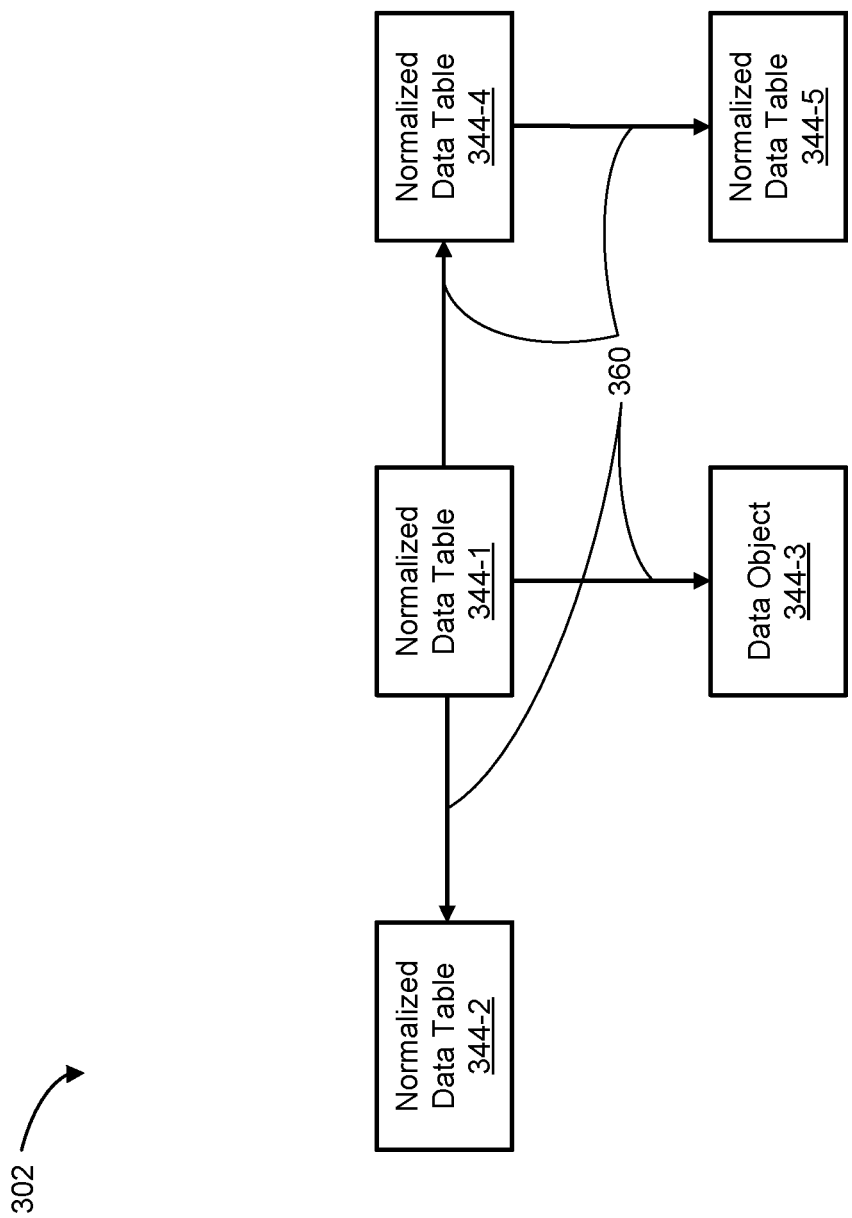

FIGS. 3A and 3B provide examples of normalized databases according to some implementations.

FIG. 4A is an example of denormalized data according to some implementations.

FIG. 4B-4H illustrate forming normalized schemas according to some implementations.

Figure 5A:
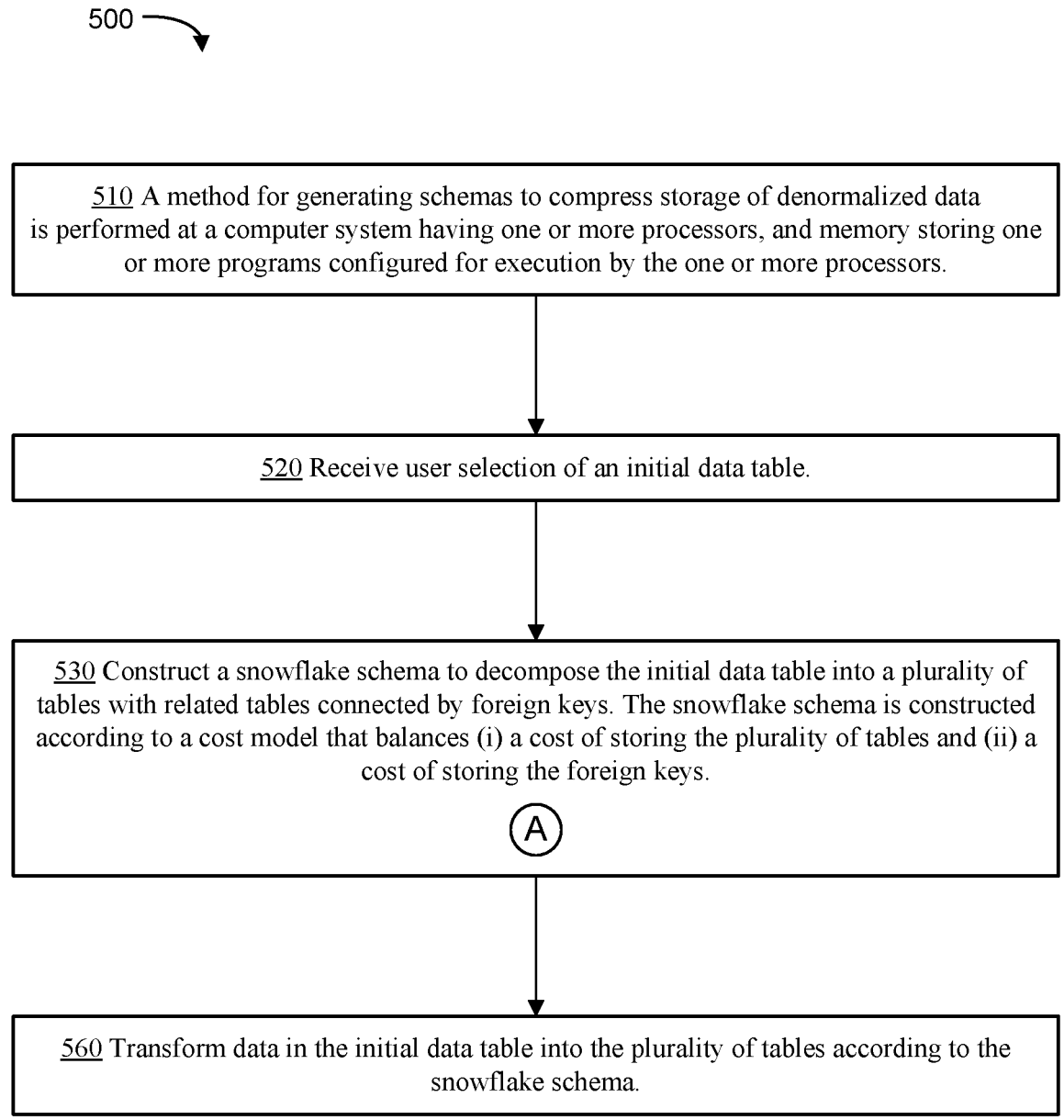
Figure 5B:
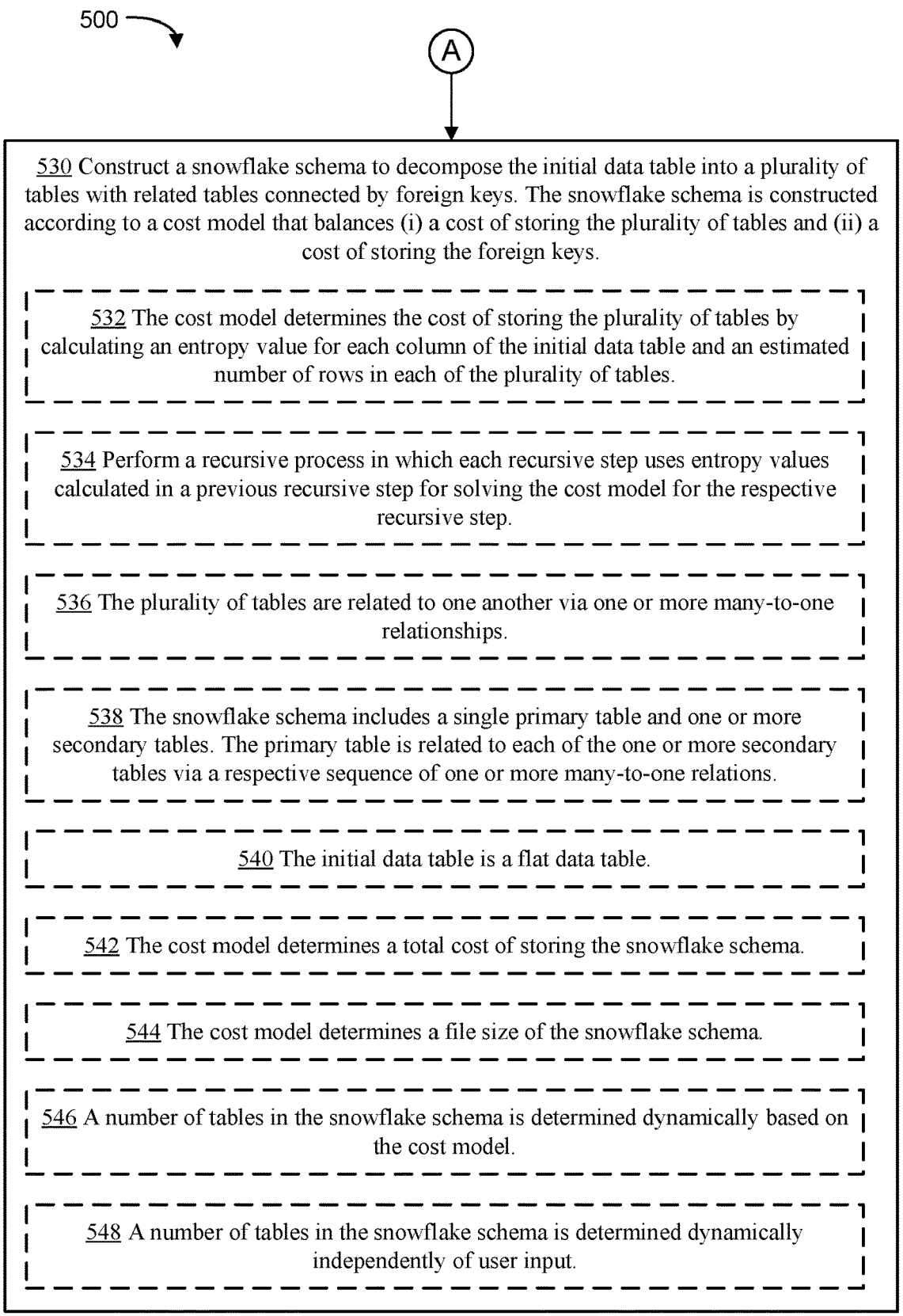
Figure 5C:
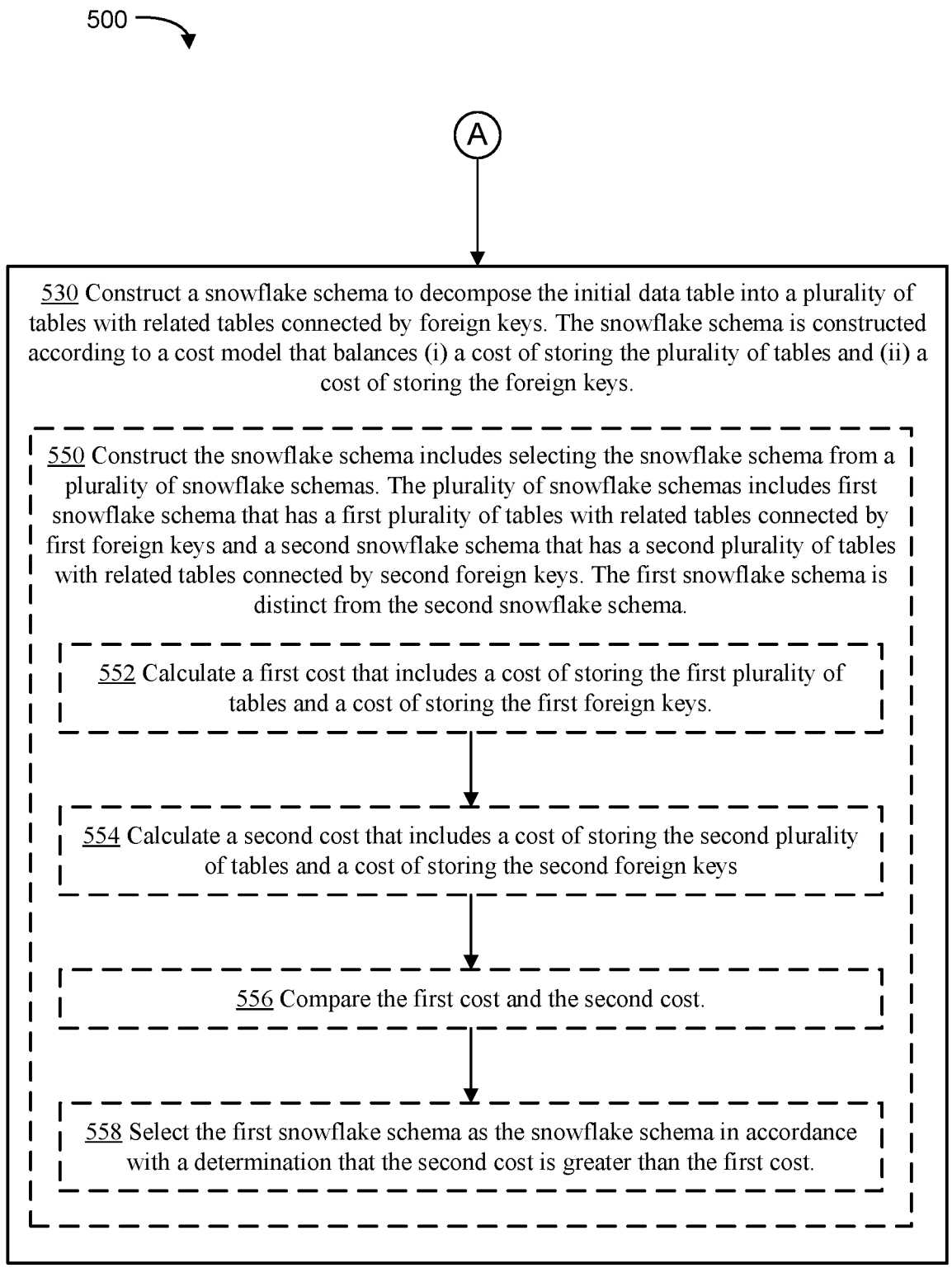

FIGS. 5A-5C provide a flow chart for a method for generating schemas to compress storage of denormalized data in accordance with some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Existing methods for automatic schema normalization rely on a two-stage process of (1) finding or specifying functional dependencies and (2) iteratively splitting tables until there are no functional dependencies that violate Boyce-Codd Normal Form (BCNF) or any other desired normal form. The result is guaranteed to be a snowflake schema in the desired normal form. However, there are a number of challenges with this basic approach, including:

Enumerating all data-derived minimal functional dependencies is computationally costly;

A small number of errors in the original denormalized database can obscure structurally important functional dependencies, resulting in a poor learned schema;

Dependencies in the data may be due to chance and not true functional dependencies grounded in real world facts; and Multiple decompositions into normalized schema can satisfy a given normal form. Existing greedy heuristics may not choose an optimal decomposition.

The present application introduces an alternative method to normalize a database, which is faster, produces good results even when there are errors in the raw data, and produces schemas that are more efficient to query.

Figure 1:
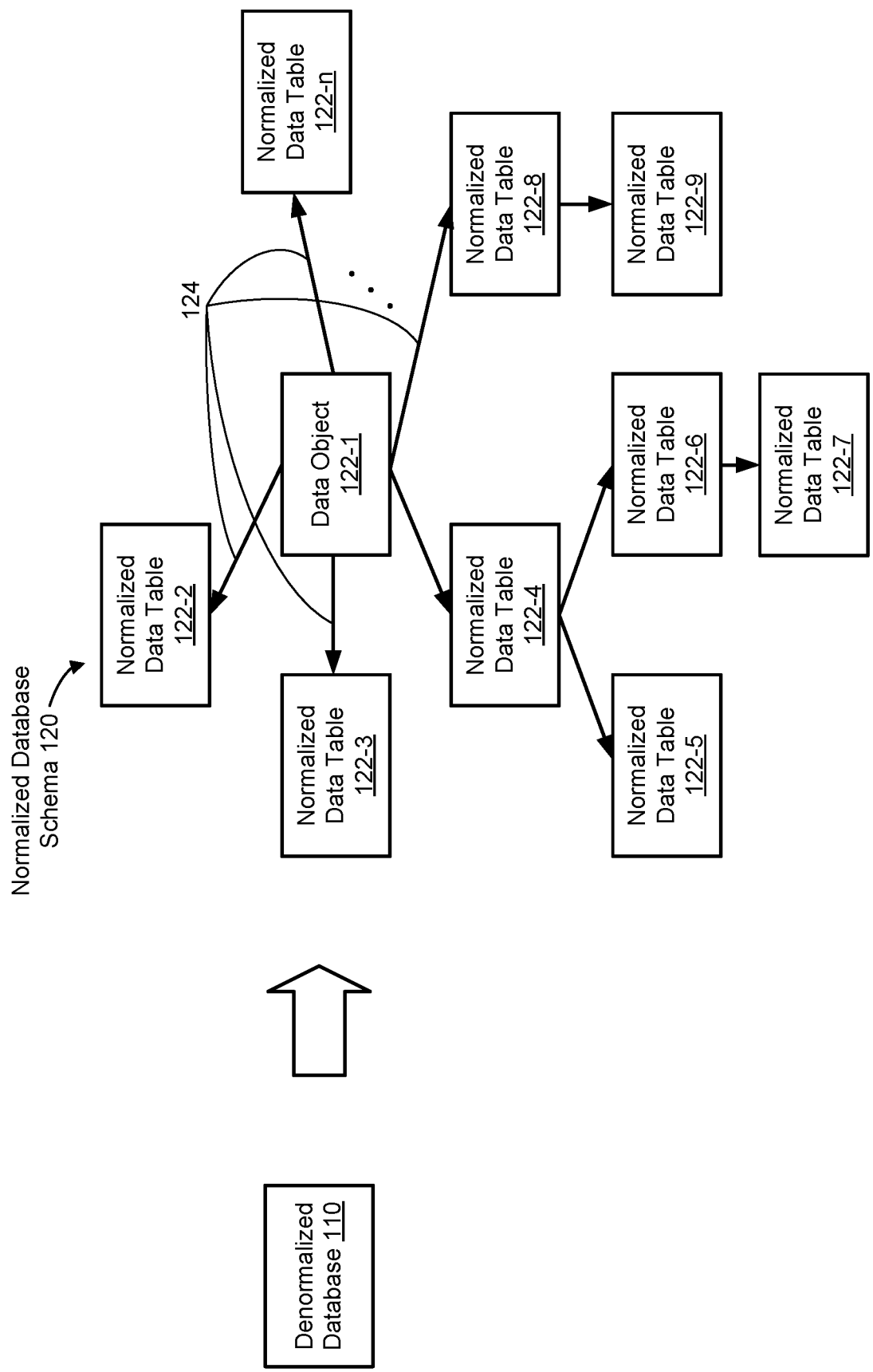
FIG. 1 illustrates transforming a denormalized dataset into an equivalent normalized schema in accordance with some implementations.

FIG. 1 illustrates transforming a denormalized database 110 (e.g., a denormalized dataset, a denormalized table, or denormalized data) into an equivalent normalized database schema 120 (e.g., a normalized dataset, a normalized database, a normalized schema, a normalized data structure, or a normalized object model) in accordance with some implementations. The denormalized database 110 is a database that has not been normalized. For example, a denormalized database 110 may be a flat data table. In many cases, a denormalized database includes characteristics that are undesirable in data analysis. For example, a denormalized database may include redundant data (e.g., redundant or duplicate records/rows), insertion anomalies, update anomalies, and deletion anomalies. In some implementations, it may be desirable to store information as a denormalized database. For example, it may be preferable to store information in a denormalized database in read-intensive cases to prioritize read performance, such as when sharing a database.

In some implementations, it is preferable to store information in a normalized database. Normalized databases have the benefit of reduced redundancy, which can reduce storage usage (e.g., storage cost or file size of the database) and, in some cases, improve user comprehension of the data stored in the database. In some implementations, the purpose of generating a normalized database is to remove redundant data (e.g., repetitive data or duplicate records), compress (e.g., reduce) file size, and store the information in an organized structure that is logical and easily understood and interpreted by a user.

In general, any denormalized database can be "normalized" or transformed into a normalized database. To normalize a database, columns in the denormalized database are separated into a plurality of data tables that are linked via relationships. Each data table of the plurality of data tables includes a subset of the columns stored in the database, and the data tables of the plurality of data tables are linked via many-to-one relationships. In the illustrations below, the many-to-one relationships are shown as arrows, with the arrows originating from the "many" side of the relationship and pointing towards the "one" side of the relationship. In some implementations, related data tables (e.g., data tables that are directly related to one another) in the plurality of data tables are connected by foreign keys, where one of the tables stores the primary key of the other table. A given denormalized database may be decomposed to any one of many possible normalized schemas (i.e., multiple normalized databases can accurately represent the information stored in the denormalized table). However, in many cases, there exists a schema that is preferable to other schemas. For example, a schema that provides greater storage compression (e.g., has a smaller file size) relative to other schemas is typically desirable. In some implementations, a schema that organizes the data into tables in a way that makes sense to users is preferable relative to other possible schemas. Additionally, the denormalized database may be transformed into a normalized database having the form of a snowflake schema, a star schema, or other format.

FIG. 1 provides one example of normalized database schema 120 (also referred to herein as a schema or normalized schema) that is equivalent to the denormalized database 110. The normalized database schema 120 is able to represent the data stored in the denormalized database 110, and the denormalized database 110 may be decomposed to generate (e.g., form) the normalized database schema 120 via a database normalization process. In this example, the normalized database schema 120 is a snowflake schema that includes a plurality of normalized data tables 122-1 to 112-*n* (also referred to collectively or individually as normalized data tables 122). Each of the normalized data tables 122 is related (e.g., connected, associated) to at least one other normalized data table 122 in the normalized database schema 120 via a many-to-one relationship. The many-to-one relationships in the normalized database schema 120 are represented by the arrows 124, which point from the "many" side of each relationship to the "one" side of the relationship. In some implementations, two related data tables (e.g., normalized data tables) in the normalized database schema 120 are connected by foreign keys. In some implementations, the normalized database schema 120 includes a primary data table 122-1 (e.g., a root table, a central table, or a normalized primary data table) and one or more secondary data tables (including data tables 122-2 through 112-*n*). The primary data table 122-1 is related to each data table of the one or more secondary data tables (each of data tables 122-2 through 122-*n*) via a respective sequence of one or more many-to-one relationships.

In some implementations, the normalized database schema 120 (e.g., the specific schema of the normalized database 120) is selected based at least in part on a cost model (e.g., cost function) that takes into account (e.g., takes into consideration, balances, or accounts for) the cost of storing the normalized database (e.g., the cost of storing all the data tables in the normalized database and the cost of storing all the foreign keys in the normalized database). In some implementations, the normalized database schema 120 is selected based on one or more constraints, preferences, and/or weights that are automatically generated (e.g., via machine learning methods or via default settings) or are provided by a user. Additional details regarding how a normalized database schema is selected and generated according to a denormalized database is provided with respect to FIGS. 3A-3B, 4A-4H, and 5A-5C.

Figure 2A:
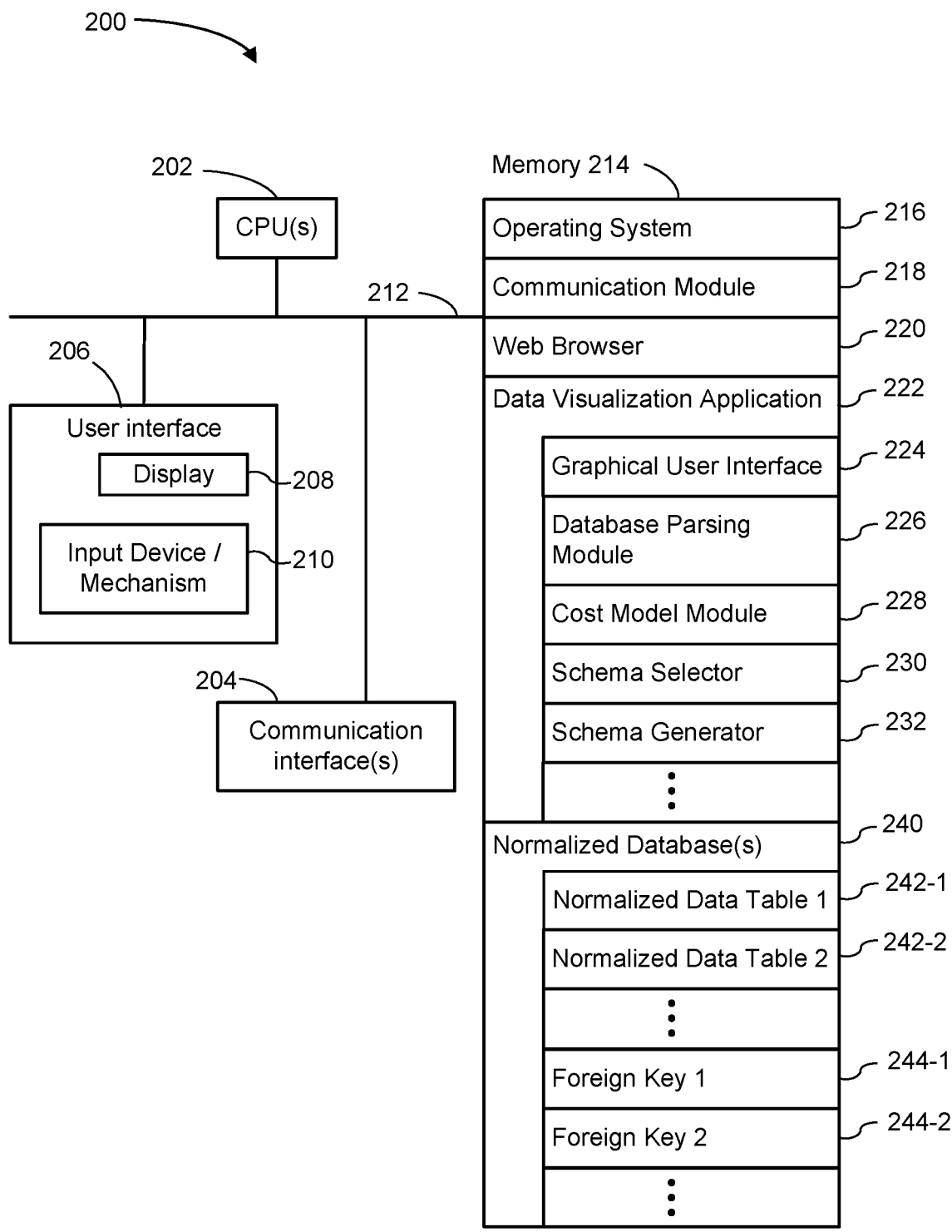
FIG. 2A is a block diagram of a computing device according to some implementations.

FIG. 2A is a block diagram of a computing device 200 (e.g., a client device) that can execute a data visualization application 222 or a data visualization web application to display a data visualization. In some implementations, the computing device displays a graphical user interface 224 for the data visualization application. The computing device 200 may be a desktop computer, a laptop computer, a tablet computer, or other computing device with a display and a processor capable of running a data visualization application 222. The data visualization application 222 may include a data source generator for database organization (e.g., generating object models for databases) as well as generating new data sources using existing databases. A computing device 200 typically includes one or more processing units/cores (CPUs) 202 for executing modules, programs, and/or instructions stored in the memory 214 and thereby performing processing operations, one or more network or other communications interfaces 204, memory 214, and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 224 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application);
- the data visualization application 222 includes a graphical user interface 224, which enables a user to build data visualizations by specifying elements visually, and also provides a graphical view to access or build object models and data sources;
- the data visualization application also includes a data parsing module 226, which identifies possible normalized database schemas that are equivalent to a denormalized database (e.g., possible normalized database schemas that can represent the denormalized database);
- the data visualization application also includes a cost model module 228, which generates a cost model (e.g., cost function) and uses the cost model to calculate respective costs for normalized database schemas that are being considered;
- the data visualization application also includes a schema selector 230, which selects a normalized database schema (from the possible normalized database schemas identified by the data parsing module 226) based on the cost model (e.g., based on a comparison of costs (as calculated by the cost model module 228) of two or more possible normalized database schemas;
- the data visualization application also includes a schema generator 232, which generates (e.g., constructs) the selected normalized database schema from data in the denormalized database (e.g., transforms the denormalized table into the selected normalized database schema). In some implementations, generating the selected normalized database schema includes transforming data in the denormalized table into a plurality of normalized tables in accordance with the denormalized table and the selected normalized database schema; and
- one or more normalized databases 240 (such as the normalized database 120). Each normalized database includes a plurality of normalized data tables, such as a first normalized data table 242-1 and a second normalized data table 242-2. Each normalized database also includes many-to-one relationships between the normalized data tables 242 of a respective normalized database, and the many-to-one relationships between the normalized data tables 242 of a respective normalized database correspond to foreign key relationships between the normalized data tables 242. Thus, each normalized database also includes one or more foreign keys 244, such as a first foreign key 244-1 and a second foreign key 244-2 (the foreign keys are typically saved as part of the normalized tables).

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
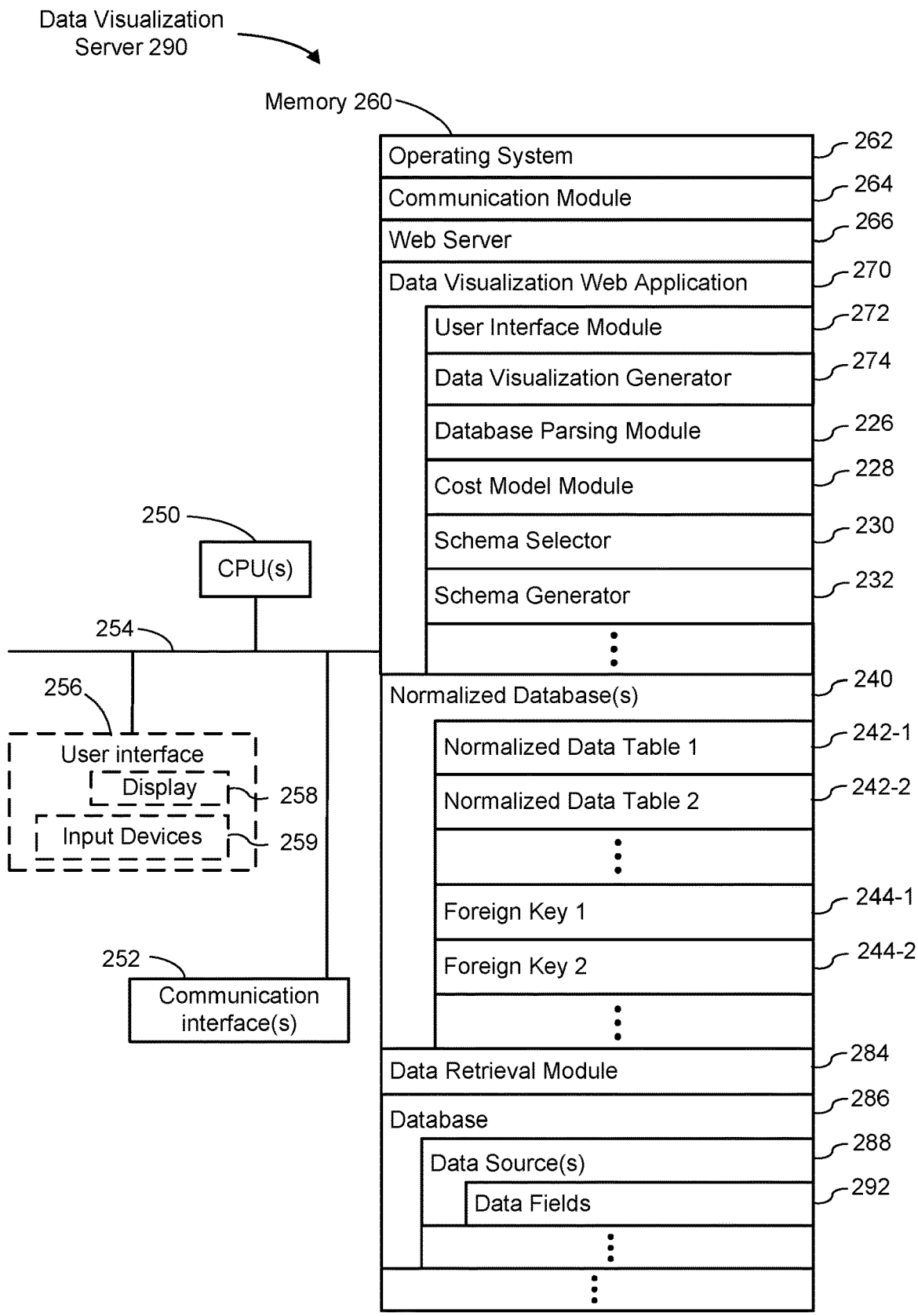
FIG. 2B is a block diagram of a data visualization server according to some implementations.

FIG. 2B is a block diagram of a data visualization server 290 in accordance with some implementations. A data visualization server 290 may host one or more databases 286 or may provide various executable applications or modules. A server 290 typically includes one or more processing units/cores (CPUs) 250, one or more network interfaces 252, memory 260, and one or more communication buses 254 for interconnecting these components. In some implementations, the server 290 includes a user interface 256, which includes a display 258 and one or more input devices 259, such as a keyboard and a mouse. In some implementations, the communication buses 254 include circuitry (sometimes called a chipset) that interconnects and controls communications between system components.

In some implementations, the memory 260 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 260 includes one or more storage devices remotely located from the CPU(s) 250. The memory 260, or alternatively the non-volatile memory devices within the memory 260, comprises a non-transitory computer readable storage medium.

In some implementations, the memory 260, or the computer readable storage medium of the memory 260, stores the following programs, modules, and data structures, or a subset thereof:

- an operating system 262, which includes procedures for handling various basic system services and for performing hardware dependent tasks;
- a network communication module 264, which is used for connecting the server 290 to other computers via the one or more communication network interfaces 252 (wired or wireless) and one or more communication networks, such as the Internet, other wide area networks, local area networks, metropolitan area networks, and so on;
- a web server 266 (such as an HTTP server), which receives web requests from users and responds by providing responsive web pages or other resources;
- a data visualization web application 270, which may be downloaded and executed by a web browser 220 on a user's computing device 200. In general, a data visualization web application 270 has the same functionality as a desktop data visualization application 222, but provides the flexibility of access from any device at any location with network connectivity, and does not require installation and maintenance. In some implementations, the data visualization web application 270 includes various software modules to perform certain tasks. In some implementations, the data visualization web application 270 includes a user interface module 272, which provides the user interface for all aspects of the data visualization web application 270;
- in some implementations, the data visualization web application includes a data visualization generator 274, which generates and displays data visualizations according to user-selected data sources (such as a denormalized database 110, and/or a normalized database 120) and data fields;
- in some implementations, the data visualization web application also includes a database parsing module 226, a cost model module 228, a schema selector 230, and a schema generate 232, each of which is described above for a computing device 200;
- one or more normalized databases 240 (including normalized data tables 242 and foreign key(s) 244), as described above for a computing device 200;
- a data retrieval module 284, which builds and executes queries to retrieve data from one or more databases 286. The databases 286 may be stored locally on the server 290 or stored at an external database system. For example, the data retrieval module 284 may retrieve a denormalized database (such as the denormalized database 110) from the database 286 for normalization (e.g., for conversion to a normalized database, such as the normalized database schema 120); and
- one or more databases 286, which store data used or created by the data visualization web application 270 or data visualization application 222. The databases 286 may store data sources 288, which provide the data used in the generated data visualizations. For example, data sources 288 may include denormalized data (such as the denormalized database 110). Each data source 288 includes one or more data fields 292. In some implementations, the database 286 stores user preferences. In some implementations, the database 286 includes a data visualization history log. In some implementations, the data visualization history log tracks each time the data visualization web application 270 or data visualization application 222 renders a data visualization.

The databases 286 may store data in many different formats, and commonly include many distinct tables, each with a plurality of data fields 292. Some databases 286 comprise a single table. For example, the database 286 may include denormalized data that is stored as a flat table (e.g., a denormalized database 110). In another example, the database 286 may be a normalized database (e.g., a normalized database 120), which includes a plurality of normalized data tables.

The data fields 292 in the database 286 include both raw fields from the database 286 (e.g., a column from a database table or a column from a spreadsheet) as well as derived data fields, which may be computed or constructed from one or more other data fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 292 are stored separately from the data source 288. In some implementations, the database 286 stores a set of user preferences for each user. The user preferences may be used when the data visualization web application 270 (or desktop data visualization application 222) makes recommendations about how to view a set of data fields 292. In some implementations, the database 286 stores a data visualization history log, which stores information about each data visualization generated.

In some implementations, the database 286 stores other information, including other information used by the data visualization application 222 or data visualization web application 270. The databases 286 may be separate from the data visualization server 290, or may be included with the data visualization server (or both).

In some implementations, the data visualization history log stores visual specifications selected by users, which may include a user identifier, a timestamp of when the data visualization was created, a list of the data fields used in the data visualization, the type of the data visualization (sometimes referred to as a "visualization type," "view type" or a "chart type"), data encodings (e.g., color, size, and shape of marks), and the data relationships selected. In some implementations, one or more thumbnail images of each data visualization are also stored. Some implementations store additional information about created data visualizations, such as the name and location of the data source 288, the number of rows from the data source that were included in the data visualization, the version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 260 stores a subset of the modules and data structures identified above. In some implementations, the memory 260 stores additional modules or data structures not described above.

Although FIG. 2B shows a data visualization server 290, FIG. 2B is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 290 may be stored or executed on a computing device 200. In some implementations, the functionality and/or data may be allocated between a computing device 200 and one or more servers 290. Furthermore, one of skill in the art recognizes that FIG. 2B need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

FIGS. 3A-3B provide examples of normalized database schemas according to some implementations.

FIG. 3A is an example of a normalized database schema 300 (e.g., a normalized database) that is a snowflake schema. The normalized database schema 300 has a hierarchical structure and includes a plurality of normalized data tables 310 (e.g., normalized data tables 310-1 through 310-10). In particular, the first normalized data table 310-1 is the primary data table (e.g., the root data table or the central data table). The primary data table 310-1 is connected to each of normalized secondary data tables 310-2, 310-3, and 310-7 via a respective many-to-one relationship 330 (represented with the arrow pointing from the "many" side to the "one" side). In some implementations, the primary data table 310-1 does not contain any duplicate rows. In general, the normalized secondary data tables 310-2 through 310-10 do not contain duplicates either. Additionally, the normalized data tables can be grouped together into "branches." In this example, the second normalized data table 310-2 forms a first branch 320-1, the normalized data tables 310-3 through 310-6 form a second branch 320-2 (that is distinct from the first branch 320-1), and the normalized data tables 310-7 through 310-10 form a third branch 320-3 (that is distinct from each of the first branch 320-1 and the second branch 320-2).

FIG. 3B provides another example of a normalized database schema 302 that is a snowflake schema. The normalized database schema 302 is distinct (e.g., different) from the normalized database schema 300. The normalized database schema 302 has a hierarchical structure and includes a plurality of normalized data tables 344 (e.g., normalized data tables 344-1 through 344-5). In particular, the first normalized data table 344-1 is the primary data table. The primary data table 344-1 is connected to each of normalized secondary data tables 344-2, 344-3, and 334-4 via respective many-to-one relationships 360 (with the arrow pointing from the "many" side to the "one" side). In some implementations, the primary data table 344-1 does not contain any duplicates and the normalized secondary data tables 344-2 through 344-5 do not contain duplicates either.

A denormalized database can be transformed (e.g., converted or decomposed) into any one of a plurality of normalized database schemas. For example, a denormalized database may be transformed into the normalized database schema 300 or the normalized database schema 302 (e.g., both normalized database schemas 300 and 302 represent the same denormalized database). While both normalized database schemas 300 and 302 have a schema type corresponding to a snowflake schema, the normalized database schemas 300 and 302 are different schemas because the columns from the original denormalized database are allocated to different tables.

In some implementations, transforming a denormalized database into a normalized database schema includes selecting a schema. In some implementations, the schema is selected based at least in part on the total cost of storing the schema (e.g., the file size of the database using the schema). The cost of storing the database can be divided into two parts: (i) the total cost of storing all of the data tables in the schema and (ii) the total cost of storing all of the foreign keys between the data tables in the database.

The cost of storing a data table is equal to the total cost of storing all of the columns within the data table. The cost of storing a column can be represented by the entropy of the column (e.g., the number of bits required to store values in the column). Thus, the cost of storing a data table can be determined by calculating the sum of the entropy of each column in the data table. The entropy for a column is the entropy for one data value in the column times the number of rows in the table.

The cost of storing foreign keys is determined (e.g., calculated) based on the number of rows in the many-side table multiplied by the entropy of the foreign key (e.g., the entropy of all columns in the foreign key). In some implementations, the foreign key can be assumed to be an integer index into the rows of the one-side table, and the primary key side (e.g., the one-side) is an implicit integer index that is not stored. The number of rows in the one-side table determines the size required for the foreign key (e.g., $\log_2$(number of rows))

Columns of a data table (e.g., a denormalized table) can be partitioned into two tables that are connected via a foreign key. In such cases, all duplicate rows in at least one of the two tables can be removed (e.g., eliminated or deleted) since the duplication can be recreated by joining the two tables back together using the foreign key. Partitioning of columns in a data table can be continued (e.g., repeated) until all duplicate rows are eliminated. Thus, the total cost of storing tables for a schema is minimized when the denormalized table is decomposed so that each column is its own table. In contrast, the cost of storing foreign keys for a schema is minimized when the schema includes only one table (and thus, does not require a foreign key, so the cost of storing foreign keys is zero). Thus, selecting a schema to represent a denormalized table based on the total cost of storing the schema (e.g., the sum of the total cost of storing all tables within the schema and the total cost of storing all the foreign keys between the data tables in the schema) involves finding a trade-off between the cost of storing tables and the cost of storing foreign keys, which ultimately determines the number of data tables in the schema. Thus, the number of tables in the schema is dynamically determined based on the selected schema (e.g., based on finding a minimum of the cost function for storing the schema) and is not predetermined or prespecified (e.g., not specified by a user or in accordance with a selected normal form).

In some implementations, it is also desirable to generate a normalized database schema that groups columns that have the same level of detail in the same data table in order to capture the hierarchical structure between different levels of detail. This challenge is addressed inherently by selecting a normalized schema based on a cost of storing the schema, as used herein.

Selecting a normalized database schema based on the cost of storing the schema provides a schema that preferentially reduces (e.g., minimizes) storing duplicate rows. When decomposing a denormalized data table into a plurality of data tables, one or more columns may be grouped together to be included in a same data table. The number of duplicate rows within each column is minimized if the one or more columns are one-to-one with one another (e.g., columns that have the same level of detail), since eliminating a duplicate row in one column also leads to eliminating duplicate rows in the other columns (e.g., all duplicate rows can be eliminated from the data table). Thus, selecting normalized schema based on a cost of storing the schema will result in selecting a schema that inherently groups columns that are one-to-one with one another (e.g., columns that have a same level of detail) or columns that are almost one-to-one with one another (e.g., columns that have a similar level of detail) in the same data table.

Selecting a normalized schema based on a cost of storing the schema also provides a schema that tends to build hierarchies where possible. Since the cost of storing foreign keys is determined by multiplying the number of rows in the many-side table by the entropy of the foreign key, the cost of storing foreign keys is reduced (e.g., minimized) when the foreign key is stored in a data table with as few rows as possible (e.g., when the "many-side" table has few rows).

For example, if the denormalized table has been decomposed into three tables: "Orders", "Customers", and "State", it may be unclear how the three tables may be organized in a hierarchy. The "State" data table could be a child of "Orders" data table or a child of the "Customers" data table, since "State" is functionally dependent on both. In the case where there are fewer Customers than Orders (e.g., fewer rows in the "Customers" data table compared to the "Orders" data table), a schema that includes the "State" data table as a child of the "Customers" table will have a smaller cost for storing the foreign key compared to a schema that includes the "State" data table as a child of the "Orders" data table (since there are fewer Customers than Orders). Thus, when selecting a normalized schema based on a cost of storing the schema, the cost function will result in the schema that has the "State" data table as a child of the "Customers" data table since the total cost of storing the foreign keys (and therefore, also the cost of storing the schema) will be lower than a cost of storing a schema that includes the same three tables but has the "State" data table as a child of the "Orders" data table.

Further, selecting a normalized schema based on the cost of storing the schema can also handle the situation where a column may include multiple functional dependencies (including accidental functional dependencies). For example, a column with low cardinality (e.g., many duplicate rows) is likely to be functionally dependent on many other columns. Thus, when selecting between multiple similar possible schemas that include the column with low cardinality, the schema with the lowest cost of storing the schema would likely include the column with low cardinality as a child of the smallest table in the schema, thereby reducing (e.g., minimizing) the cost of storing foreign keys compared to other schema. This likely places the columns with low cardinality at a low level in the hierarchy of the schema, thereby maintaining the multiple functional dependencies of the column.

The normalized database schema with the smallest storage cost corresponds to the global minimum of the cost model. One method of determining (e.g., identifying or calculating) the global minimum of the cost model includes calculating the cost of storing the schema for each possible schema. However, this can be a time-consuming and resource-intensive task and may not be scalable for working with many denormalized databases and/or large denormalized databases. In contrast, the cost function can be optimized by performing calculations that allows solved subproblems to be solved once and shared to other calculations via memoization. The method starts by building a first data table for a normalized schema that includes a first column of the denormalized database. Each branch of the calculation either adds a second column in the denormalized database to the first data table or adds the second column to a list of remaining columns to be added to sibling tables to the first data table in a later recursive call. The recursive calls in the calculation recurses on each table to generate child tables (e.g., to generate a new table that is a child of an existing table in the normalized schema using at least one column from the existing table, such as generating a child table or grandchild table to the first data table) or to recurse on the remaining columns to create sibling tables (e.g., sibling tables to an existing table in the normalized schema, such as generating a sibling table to the first data table).

The speed of determining (e.g., selecting, identifying, building, and/or generating) the normalized database schema through these recursive calls can be reduced (e.g., sped up) by: i) using a branch and bound comparison to prune (e.g., skip) branches of the calculation that are unlikely to include better solutions (e.g., unlikely to produce schemas with a lower cost), ii) ordering the columns from highest entropy to lowest entropy, and iii) use of memoization in recursive calls.

A branch and bound comparison compares a partial solution (e.g., solved subproblem) to lower bound values and/or upper bound values of respective branches in the calculation in order to determine whether or not the branch is likely to include (e.g., produce, generate, or contain) solutions with lower cost than the currently found partial solution. If so, solutions in the branch are worth calculating. If not, the branch can be skipped, thereby speeding up the calculation. A partial solution (e.g., an optimal solution found for columns 1 through column m (where m<total number of columns in the denormalized database)) for the denormalized database can be used as a starting point from which to compare solutions for all columns in the denormalized table. For example, for a denormalized table that includes 30 columns, a partial solution (e.g., an optimal solution found for the columns 1 through column m (where m is smaller than 30)) determines the first cost (e.g., a local minimum), which can be compared to upper bound values and lower bound values of respective branches of the calculation in order to determine if the respective branch can be pruned (e.g., ignored or skipped). For a given branch, a lower bound value of the branch corresponds to a solution that does not include the addition of any foreign keys (e.g., a schema that adds the next column in the denormalized database to the current data table of the normalized database (e.g., does not place the next column in the denormalized database into a new data table)). The lower bound value of the branch is compared to the first cost (e.g., the lowest cost found so far) and when the first cost is smaller than the lower bound value for the respective branch, it can be assumed that solutions in the respective branch are likely to have a higher cost and thus, the calculation of solutions in the respective branch can be skipped (e.g., the branch can be pruned). Similarly, for a given branch, an upper bound value of the branch can be calculated and compared to the first value. In the case where the upper bound value for the respective branch is smaller than the first value, then a better solution (e.g., schema with lower cost than the first cost) is likely to be found in the respective branch.

Using the branch and bound method, branches in the calculation that lead to higher costs can be quickly pruned and skipped over in the calculation, thereby reducing calculation time and improving the efficiency of the search.

In addition to using a branch and bound comparison to identify branches of the calculation that can be skipped, the cost function of a schema tends to be dominated by high entropy columns of the denormalized database. Thus, partial solutions to the cost function that include high entropy columns from the denormalized database provide partial solutions associated with the first cost that is more similar to the global minimum, thereby leading to much more rigorous pruning when employing the branch and bound comparison.

Further, the recursive process in the calculation can be sped up via the use of memoization. Once the entropy of a column in the denormalized database is calculated, the calculated entropy of the respective column in the denormalized database can be shared across multiple calculations throughout the recursive process (to determine the cost of storing data tables and foreign keys in a normalized schema) without having to recalculate the entropy of the respective column for each cost calculation (e.g., each recursive step). Thus, each recursive step uses entropy values calculated in a previous recursive step for solving the cost model for the respective recursive step.

FIG. 4A provides an example of a denormalized database 400 (e.g., denormalized data table) according to some implementations. The denormalized database 400 includes a plurality of columns 410 and a plurality of rows 412 (e.g., rows 412-1 and 412-2). In this example, the denormalized database 400 includes 14 columns 410 (e.g., columns 410-1 through 410-14) and 32,434,489 rows (a subset of which is shown in FIG. 4A). Each column 410 is a data field and includes one or more data values. For example, the first column 410-1 corresponds to an "Aisle" data field and includes data values that are aisle numbers. Additionally, the denormalized database 400 includes columns 410 that have duplicated data values. For example, the "Product Name" column includes a plurality of instances of "Vanilla Cola" and "Mint Chip Ice Cream." Thus, by transforming the denormalized database 400 into a normalized schema, such duplicated rows could be eliminated, thereby eliminating the total cost of storing the data and improving user comprehension of the data.

The denormalized database 400 can be transformed into any one of a number of possible normalized database schemas. The normalized database schema in which the denormalized database 400 is transformed is selected based on the total cost of storing the normalized database schema, which includes the total cost of storing all data tables in the schema and the total cost of storing all foreign keys in the schema. By minimizing the cost of storing the schema (e.g., finding a global minimum or a local minimum of a cost function that models the total cost of storing the schema), a normalized database schema 402 is selected.

FIG. 4B-4H provide an example of a normalized database schema 402 corresponding to the denormalized database 400 according to some implementations.

Figure 4B:
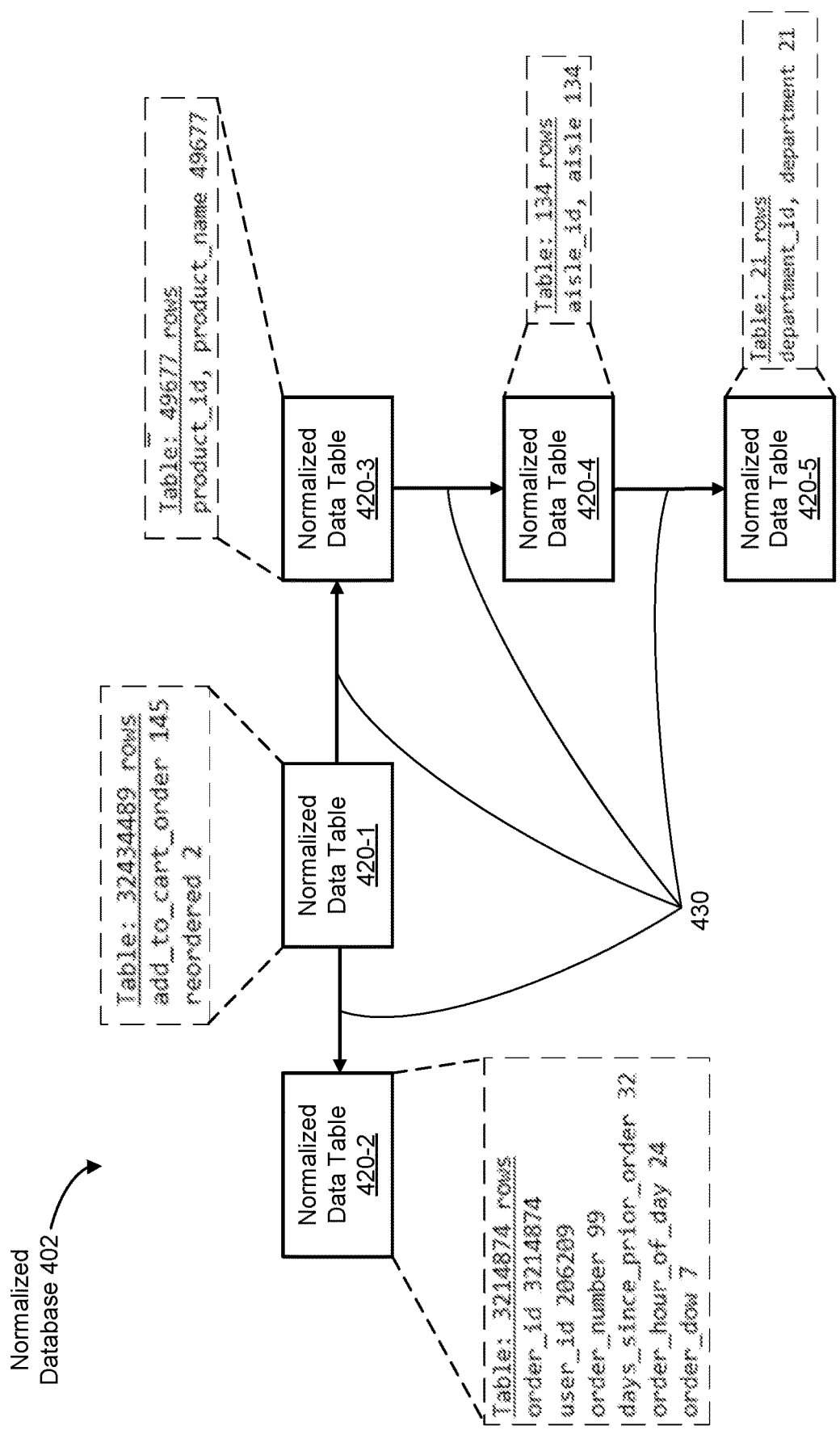
Figure 4C:
Figure 4D:

Referring to FIG. 4B, the normalized database schema 402 is selected based on the total cost of storing the schema (e.g., the normalized database schema 402 has the lowest cost relative to other normalized database schemas). The normalized database schema 402 includes a plurality of data tables 420 (shown in FIGS. 4C-4G) and a plurality of foreign keys (an example of which is provided with respect to FIG. 4H) that are represented by the many-to-one relationships 430 that connect the plurality of data tables 420. The many-to-one relationships 430 are illustrated with arrows originating from the "many" side of the relationship and pointing towards the "one" side of each relationship. In this example, the normalized data table 420-1 is the primary table (e.g., the root table).

Figure 4E:
Figure 4F:

In order to generate the normalized database schema 402, the denormalized database 400 is decomposed to form the data tables 420 in the normalized database schema 402. In this example:
 the first normalized data table 420-1, shown in FIG. 4C, includes 32,434,489 rows and includes two columns: "Add to Cart Order" and "Reordered;"
 the second normalized data table 420-2, shown in FIG. 4D, includes 3,214,874 rows and includes six columns:

"Order ID," "User ID," "Order Number," Days Since Prior Order," Order Hour of Day," and "Order Dow;"

the third normalized data table 420-3, shown in FIG. 4E, includes 49,677 rows and includes two columns: "Product ID" and "Product Name." In the case where the "Product ID" column and "Product Name" column are at a same level of detail (e.g., have a one-to-one correspondence to one another), the third data table 420-3 indicates that there are 49,677 different products;

the fourth normalized data table 420-4, shown in FIG. 4F, includes 134 rows and includes two columns: "Aisle ID" and "Aisle Name." In the case where the "Aisle ID" column and "Aisle Name" column are at a same level of detail (e.g., have a one-to-one correspondence to one another, are one-to-one with each other), the data table 420-4 indicates that there are 134 different aisles; and the fifth normalized data table 420-5, shown in FIG. 4G, includes 21 rows and includes two columns: "Department ID" and "Department Name." In the case where the "Department ID" column and "Department Name" column are at a same level of detail (e.g., have a one-to-one correspondence with each other), the data table 420-5 indicates that there are 21 different departments.

The first normalized table 420-1 has the same number of rows as the original denormalized table (e.g., one row per order line item). Each of the other tables 420-2 to 420-5 in the normalized database schema 402 has fewer rows than the denormalized database 400, indicating that the decomposition of the denormalized database 400 allowed at least some duplicates (e.g., duplicate rows, duplicate records) to be eliminated in the data tables 420-2 to 420-5.

Additionally, many of the data tables 420 include columns that are at a same level of detail. For example, the third data table 420-3 includes the "Product ID" column and the "Product Name" column, which have the same level of detail. Similarly, the fourth data table 420-4 includes the "Aisle ID" column and the "Aisle Name" column, which have the same level of detail (each aisle number is associated with a unique aisle name). In a third example, the fifth data table 420-5 includes the "Department ID" column and the "Department Name" column, which have the same level of detail (each department ID is associated with a unique department). Thus, the selected normalized database schema 402 represents data from the denormalized database 400 in an organized hierarchical structure that allows a user to easily comprehend the data and the relationships between the data fields. Additionally, the selected normalized database schema 402 allows the data from the denormalized database 400 to be compressed (e.g., stored as a smaller file size) due to the elimination of duplicates from the data tables 420.

Figure 4H:

In addition to the data tables, the normalized database 402 also includes a plurality of foreign keys that connect the data tables. The information stored in the foreign keys is represented by the many-to-one-relationships 430 between data tables of the normalized database 402. FIG. 4H illustrates an example of foreign keys 432 that connect the data tables 420-4 and 420-5. The data table 420-4 is connected to the data table 420-5 via a many-to-one relationship with the data table 420-4 on the "many" side and the data table 420-5 on the "one" side. Thus, the foreign keys 432 include the same number of rows as there are aisles, which is 134. Because the department table 420-5 has only 21 rows, it requires 5 bits to store each foreign key ($2^4 < 21 <= 2^5$). The total cost for storing these foreign keys in the aisle table 420-4 is (134 rows)×(5 bits)=670 bits.

As shown, each aisle in the aisle table 420-4 corresponds to a department in the department table 420-5. Additionally, multiple aisles may correspond to the same department. For example, aisles 3 and 4 both correspond to department ID 1.

Thus, by storing information regarding the one-to-many relationships 430 in the normalized database schema 402 in foreign keys (like the foreign keys 432), information from the denormalized database 400 is retained even with the elimination of duplicates in the data tables 420. For instance, using the foreign keys and the data tables 420, a user can fully recreate the denormalized database 400 from the normalized database schema 402.

FIGS. 5A-5C provide a flow chart of a method 500 for generating schemas (e.g., normalized database schemas 120, 300, 302, and 402) to compress storage of denormalized data (e.g., denormalized databases 110 and 400). The method is performed (510) (e.g., executed) at a computing system (e.g., a computing device 200 or a data visualization server 290) having one or more processors, and memory storing one or more programs configured for execution by the one or more processors. The method 500 includes receiving (520) user selection of an initial data table (e.g., a denormalized database 400) and constructing (530) a snowflake schema (e.g., a normalized database schema 402) to decompose the initial data table into a plurality of tables (e.g., the data tables 420) with related tables connected by foreign keys (e.g., such as the foreign keys 432. The snowflake schema 402 is constructed according to a cost model (e.g., a cost function) that balances (i) the cost of storing the plurality of tables 420 and (ii) the cost of storing the foreign keys. The method 500 also includes transforming (560) data in the initial data table 400 into the plurality of tables 420 according to the snowflake schema 402.

In some implementations, the cost model determines (532) the cost of storing the plurality of tables 420 by calculating an entropy value (e.g., the number of bits required to store data values in the column) for each column 410 of the initial data table 400 (e.g., the denormalized database 400) and an estimated number of rows in each of the plurality of tables 420.

In some implementations, constructing (530) the snowflake schema 402 includes performing (534) a recursive process in which each recursive step uses entropy values calculated in a previous recursive step for solving the cost model for the respective recursive step.

In some implementations, the plurality of tables 420 of the snowflake schema 402 are related (536) to one another via one or more many-to-one relationships 430.

In some implementations, the snowflake schema 402 includes (538) a single primary data table 420-1 (e.g., a normalized primary table) and one or more secondary data tables (e.g., the normalized data tables 420-2 through 420-5). The primary data table 420-1 is related to each of the one or more secondary data tables (e.g., data tables 420-2 through 420-5) via a respective sequence of one or more many-to-one relationships 430.

In some implementations, the initial data table 400 (e.g., denormalized database 400) is (540) a flat data table.

In some implementations, the cost model (e.g., cost function) determines (542) the total cost of storing the snowflake schema 402. In some implementations, selecting the snowflake schema includes minimizing the cost model and selecting the snowflake schema that has a lowest storage cost. In some implementations, minimizing the cost model includes finding a local minimum of the cost model (e.g., cost function). In some implementations, minimizing the cost model includes finding a global minimum of the cost model (e.g., cost function).

In some implementations, the cost model determines (544) the file size of the snowflake schema 402. In some implementations, the snowflake schema 402 is selected based on the file size of the snowflake schema 402 (e.g., the selected snowflake schema 402 has a file size that is smaller than other possible normalized schemas).

In some implementations, the number of data tables 420 in the snowflake schema 402 is determined (546) dynamically based on the cost model (e.g., the number of data tables in the normalized database schema is not predefined by a user or based on a specified normal form).

In some implementations, the number of data tables 420 in the snowflake schema 402 is determined dynamically independently of user input (e.g., not predefined by a user).

In some implementations, constructing (530) the snowflake schema includes selecting (550) the snowflake schema 402 from a plurality of snowflake schemas. The plurality of snowflake schemas includes a first snowflake schema that has a first plurality of tables with related tables connected by first foreign keys and a second snowflake schema of the plurality of snowflake schemas that has a second plurality of tables with related tables connected by second foreign keys. The first snowflake schema is distinct (e.g., different) from the second snowflake schema. The first plurality of tables is different from the second plurality of tables. The first foreign keys are different from the second foreign keys. Selecting the snowflake schema 402 includes: calculating (552) a first cost that includes the cost of storing the first plurality of tables and the cost of storing the first foreign keys, calculating (554) a second cost that includes the cost of storing the second plurality of tables and the cost of storing the second foreign keys, and comparing (556) the first cost and the second cost. Selecting the snowflake schema 402 also includes, when the second cost is greater than the first cost, selecting (558) the first snowflake schema as the snowflake schema 402. Examples of three different snowflake schema 300, 302, and 402 are provided with respect to FIGS. 3A, 3B, and 4B, respectively.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating schemas to compress storage of denormalized data, comprising:
at a computing device having a display, one or more processors, and memory storing one or more programs configured for execution by the one or more processors:
receiving user selection of an initial data table;
identifying a plurality of candidate snowflake schemas, each having a respective set of tables with related tables linked by respective foreign keys;
for each of the plurality of candidate snowflake schemas, computing a respective total storage space required, including (i) storage space required for the respective set of tables and (ii) storage space required for the respective foreign keys, wherein the storage space required for the respective set of tables is computed by calculating an entropy value for each column of the initial data table and an estimated number of rows in each of the tables;
selecting a snowflake schema, of the plurality of candidate snowflake schemas, having a least total storage space required, including performing a recursive process in which each recursive step uses entropy values calculated in a previous recursive step for computing the respective total storage space required for the respective recursive step;
decomposing the initial data table according to the selected snowflake schema into a set of tables with related tables connected by foreign keys; and
transforming data in the initial data table into the set of tables according to the selected snowflake schema.

2. The method of claim 1, wherein the respective set of tables for each candidate snowflake schema are related to one another via one or more many-to-one relationships.

3. The method of claim 1, wherein the set of tables of the selected snowflake schema includes a single primary table and one or more secondary tables, and the primary table is related to each of the one or more secondary tables via a respective sequence of one or more many-to-one relationships.

4. The method of claim 1, wherein the initial data table is a flat data table.

5. The method of claim 1, wherein computing the respective total storage space required for each of the plurality of candidate snowflake schemas includes determining a respective file size of each of the plurality of candidate snowflake schemas.

6. The method of claim 1, wherein a number of tables in the set of tables of the selected snowflake schema is determined dynamically independently of user input.

7. A computing device, comprising:
one or more processors;
memory;
a display; and
one or more programs stored in the memory and configured for execution by the one or more processors, the one or more programs comprising instructions for:
receiving user selection of an initial data table;
identifying a plurality of candidate snowflake schemas, each having a respective set of tables with related tables linked by respective foreign keys;
for each of the plurality of candidate snowflake schemas, computing a respective total storage space required, including (i) storage space required for the respective set of tables and (ii) storage space required for the respective foreign keys, wherein the storage space required for the respective set of tables is computed by calculating an entropy value for each column of the initial data table and an estimated number of rows in each of the tables;

selecting a snowflake schema, of the plurality of candidate snowflake schemas, having a least total storage space required, including performing a recursive process in which each recursive step uses entropy values calculated in a previous recursive step for computing the respective total storage space required for the respective recursive step;

decomposing the initial data table according to the selected snowflake schema into a set of tables with related tables connected by foreign keys; and transforming data in the initial data table into the set of tables according to the selected snowflake schema.

8. The computing device of claim 7, wherein a number of tables in the set of tables of the selected snowflake schema is determined dynamically independently of user input.

9. A non-transitory computer readable storage medium storing one or more programs configured for execution by a computing device having one or more processors, memory, and a display, the one or more programs comprising instructions for:

receiving user selection of an initial data table;

identifying a plurality of candidate snowflake schemas, each having a respective set of tables with related tables linked by respective foreign keys;

for each of the plurality of candidate snowflake schemas, computing a respective total storage space required, including (i) storage space required for the respective set of tables and (ii) storage space required for the respective foreign keys, wherein the storage space required for the respective set of tables is computed by calculating an entropy value for each column of the initial data table and an estimated number of rows in each of the tables;

selecting a snowflake schema, of the plurality of candidate snowflake schemas, having a least total storage space required, including performing a recursive process in which each recursive step uses entropy values calculated in a previous recursive step for computing the respective total storage space required for the respective recursive step;

decomposing the initial data table according to the selected snowflake schema into a set of tables with related tables connected by foreign keys; and transforming data in the initial data table into the set of tables according to the selected snowflake schema.

10. The non-transitory computer readable storage medium of claim 9, wherein a number of tables in the set of tables of the selected snowflake schema is determined dynamically independently of user input.

11. The method of claim 1, wherein:

the plurality of candidate snowflake schemas include a first snowflake schema having a first plurality of tables with related tables connected by first foreign keys;

the plurality of candidate snowflake schemas include a second snowflake schema having a second plurality of tables with related tables connected by second foreign keys;

the first snowflake schema is distinct from the second snowflake schema; and selecting the snowflake schema includes:

calculating a first cost that includes storage space required for the first plurality of tables and storage space required for the first foreign keys;

calculating a second cost that includes storage space required for the second plurality of tables and storage space required for the second foreign keys;

comparing the first cost and the second cost; and in accordance with a determination that the second cost is greater than the first cost, selecting the first snowflake schema as the snowflake schema.

* * * * *